Patented Oct. 13, 1953

2,655,447

UNITED STATES PATENT OFFICE 2,655,447

COMPOSITION AND METHOD

Charles W. Todd, Wilmington, Del., assignor to
E. I. du Pont de Nemours & Company, Wilmington, Del., a corporation of Delaware No Drawing. Application February 14, 1952,
Serial No. 271,634

9 Claims. (Cl. 71—2.6)

This invention relates to herbicidal compositions and methods employing as an essential active ingredient a di- or tri-substituted urea of the kind more particularly described below.

This application is a continuation-in-part of my copending applications: Serial No. 131,498 filed December 6, 1949, Serial No. 186,118 filed September 21, 1950, Serial No. 231,061 filed June 11, 1951, Serial No. 231,062 filed June 11, 1951, and Serial No. 228,992 filed May 29, 1951, all of which are now abandoned except application Serial No. 186,118.

Because of the enormous losses caused by weeds, the problem of weed control is a major one in agricultural economy. Although 2,4-dichlorophenoxyacetic acid (2,4-D), trichloroacetic acid and related synthetic chemicals have proven effective for the eradication of a number of objectionable leafy plants, these chemicals have not been particularly successful in the control of obnoxious grasses such as Johnson grass, Bermuda grass, nut grass, quack grass and the like. There is a great need, therefore, for additional herbicides for the control of weeds resistant to the presently available products.

It is an object of this invention to provide new herbicidal compositions and methods. A further object is to provide new herbicidal compositions effective for the control of weeds and obnoxious grasses. Other objects will appear hereinafter.

The foregoing and other objects of the invention are attained by means of herbicidal compositions containing as an essential active ingredient a 1,3-substituted urea selected from compounds represented by the formulas:

(1) 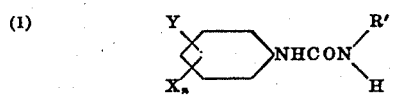

(2) 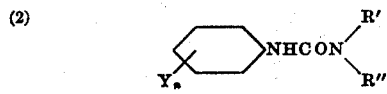

(3) 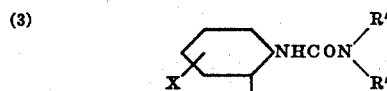

(4) 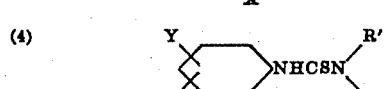

(5) 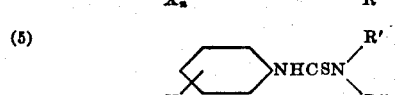

(6) 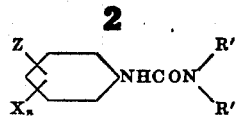

In the above formulas, R' is an alkyl radical containing up to two carbon atoms, i. e., methyl or ethyl; R" is selected from hydrogen and alkyl up to two carbon atoms; X is halogen; Y is selected from hydrogen, R and OR, where R is a monovalent aliphatic hydrocarbon radical of up to four carbon atoms having at most one unsaturation and that ethylenic; Z is selected from alkenyl and alkenoxy radicals, the alkenyl radical in said alkenyl and alkenoxy substituents containing up to four carbon atoms; and $n$ is a positive integer up to two. The compounds are still further characterized by having the aromatic substituent (i. e., the substituent containing the benzene nucleus) have hydrogen on at least one of the nuclear carbons ortho to the nuclear carbon to which the urea nitrogen atom is linked. In other words, at least one of the ortho positions is unsubstituted.

In the above formulas, X is preferably chlorine, R' is preferably methyl, and Y is preferably hydrogen or methyl.

The 1,3-substituted ureas employed in the herbicidal compositions and methods of this invention can be prepared by conventional methods, for example, by reaction of a primary or secondary amine with an isocyanate, isothiocyanate, carbamyl chloride, or thiocarbamyl chloride. More specifically, the following equations illustrate various methods which can be suitably employed for the preparation of representative ureas.

(7) 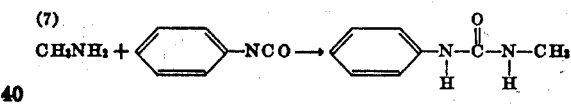

(8) 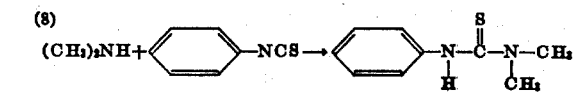

(9) 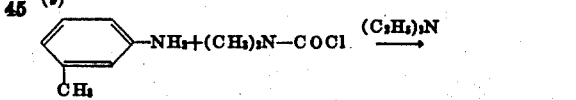

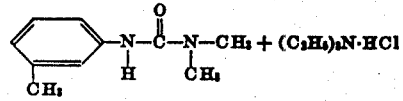

The above reactions are accomplished by bringing the amine in contact with one of the other reactants specified, usually in chemically equivalent amounts, and, if necessary, heating to reaction temperature. It is, in many cases, preferable to use an excess of amine, for example, 10–20% molar excess.

Although not, in general, essential, inert liquid media, for example, dry toluene, benzene, chlorobenzene, dioxane, and the like, can, for the most part, be advantageously employed in the methods outlined above. In employing the method of Equation 9, it is advantageous to use an acid acceptor, for example, a tertiary amine such as triethylamine, dimethylaniline, pyridine, and the like. Ordinarily, temperatures in the range of 0 to 100° C., but preferably 15 to 75° C., are satisfactorily employed for the above reactions.

Illustrative of the 1,3-substituted ureas employed in the herbicidal compositions and methods of the invention are:

3-(p-chlorophenyl)-1-methylurea
3-(m-chlorophenyl)-1-methylurea
3-(o-chlorophenyl)-1-methylurea
3-(p-bromophenyl)-1-methylurea
3-(p-iodophenyl)-1-methylurea
3-(m-fluorophenyl)-1-methylurea
3-(p-chlorophenyl)-1-ethylurea
3-(3-chloro-p-tolyl)-1-methylurea
3-(2-chloro-p-tolyl)-1-methylurea
3-(3-chloro-4-methoxyphenyl)-1-methylurea
3-(3-chloro-4-allyloxyphenyl)-1-methylurea
3-(3-chloro-4-isopropoxyphenyl)-1-methylurea
3-(3-chloro-4-ethylphenyl)-1-methylurea
3-(3-chloro-4-sec.butylphenyl)-1-methylurea
3-(3-chloro-4-isopropylphenyl)-1-methylurea
3-(2-methyl-4-chlorophenyl)-1-methylurea
3-(3,4-dichlorophenyl)-1-methylurea
3-(3,4-dichlorophenyl)-1-ethylurea
3-phenyl-1-methylurea
3-(p-tolyl)-1-methylurea
3-(3,5-dichloro-p-tolyl)-1-methylurea
3-(4-sec.butylphenyl)-1-methylurea
3-(4-allyloxyphenyl)-1-methylurea
3-(4-isopropylphenyl)-1-methylurea
3-(3,4-dimethylphenyl)-1-methylurea
3-(3,4-dimethylphenyl)-1,1-dimethylurea
3-(2,4-dimethylphenyl)-1,1-dimethylurea
3-(2,5-dimethylphenyl)-1-methylurea
3-(2,5-dimethylphenyl)-1,1-dimethylurea
3-(p-methoxyphenyl)-1-methylurea
3-phenyl-1-ethylurea
3-(p-tolyl)-1-ethylurea
3-phenyl-1,1-dimethylurea
3-(p-tolyl)-1,1-dimethylurea
3-(m-tolyl)-1,1-dimethylurea
3-(o-tolyl)-1,1-dimethylurea
3-(4-vinylphenyl)-1,1-dimethylurea
3-(4-ethylphenyl)-1,1-dimethylurea
3-phenyl-1-methyl-1-ethylurea
3-(p-tolyl)-1-methyl-1-ethylurea
3-phenyl-1,1-diethylurea
3-(p-tolyl)-1,1-diethylurea
3-(4-methoxyphenyl)-1,1-dimethylurea
3-(4-ethoxyphenyl)-1,1-dimethylurea
3-(4-ethylphenyl)-1-methylurea
3-(4-allyloxyphenyl)-1,1-dimethylurea
3-(4-isopropoxyphenyl)-1,1-dimethylurea
3-(4-isobutoxyphenyl)-1,1-dimethylurea
3-(4-isopropylphenyl)-1,1-dimethylurea
3-(4-tert.butylphenyl)-1,1-dimethylurea
3-(2,4-dichlorophenyl)-1,1-dimethylurea
3-(2,5-dichlorophenyl)-1,1-dimethylurea
3-(2,3-dichlorophenyl)-1,1-dimethylurea
3-(2,5-dichlorophenyl)-1-methyl-1-ethylurea
3-(2,5-dichlorophenyl)-1,1-diethylurea
3-(p-chlorophenyl)-1,1-dimethylthiourea
3-(m-chlorophenyl)-1,1-dimethylthiourea
3-(p-chlorophenyl)-1-methyl-1-ethylthiourea
3-(p-chlorophenyl)-1,1-diethylthiourea
3-(p-bromophenyl)-1,1-dimethylthiourea
3-(p-iodophenyl)-1,1-dimethylthiourea
3-(m-fluorophenyl)1,1-dimethylthiourea
3-(3-chloro-p-tolyl)-1,1-dimethylthiourea
3-(3,5-dichloro-p-tolyl)-1,1-dimethylthiourea
3-(3-chloro-4-methoxyphenyl)-1,1-dimethylthiourea
3-(3-chloro-4-allyloxyphenyl)-1,1-dimethylthiourea
3-(3-chloro-4-ethylphenyl)-1,1-dimethylthiourea
3-(3-chloro-4-sec.butylphenyl)-1,1-dimethylthiourea
3-(3-chloro-4-isobutoxyphenyl)-1,1-dimethylthiourea
3-(3,4-dichlorophenyl)-1-methyl-1-ethylthiourea
3-(2,5-dichlorophenyl)-1,1-dimethylthiourea
3-(p-chlorophenyl)-1-methylthiourea
3-(m-chlorophenyl)-1-methylthiourea
3-(3-chloro-p-tolyl)-1-methylthiourea
3-(3,4-dichlorophenyl)-1-methylthiourea
3-(4-isobutylphenyl)-1,1-dimethylthiourea
3-phenyl-1-methylthiourea
3-(p-tolyl)-1-methylthiourea
3-phenyl-1,1-dimethylthiourea
3-phenyl-1,1-diethylthiourea
3-(p-tolyl)-1,1-dimethylthiourea
3-(4-methoxyphenyl)-1,1-dimethylthiourea
3-(4-allyloxyphenyl)-1,1-dimethylthiourea
3-(4-sec.butylphenyl)-1,1-dimethylthiourea
3-(4-ethylphenyl)-1,1-dimethylthiourea
3-(4-isopropylphenyl)-1,1-dimethylthiourea
3-(4-tert.butylphenyl)-1,1-dimethylurea
3-(3-chloro-4-tert.butylphenyl)-1-methylurea
3-(3-chloro-4-vinyloxyphenyl)-1,1-dimethylurea
3-(3-chloro-4-allyloxyphenyl)-1,1-dimethylurea
3-(3-chloro-4-allyloxyphenyl)-1-methylurea
3-(3,5-dichloro-4-allyloxyphenyl)-1,1-dimethylurea
3-(3,5-dichloro-4-allyloxyphenyl)-1-methylurea
3-[3-chloro-4-(2-butenoxy)phenyl]-1,1-dimethylurea
3-[4-(2-butenoxy)phenyl]-1,1-dimethylurea
3-[3-chloro-4-(2-butenoxy)phenyl]-1-methylurea
3-(3-chloro-4-vinylphenyl)-1,1-dimethylurea
3-(3-chloro-4-vinylphenyl)-1-methylurea The herbicidal compositions of the invention are prepared by admixing one or more of the 1,3-substituted ureas defined heretofore, in herbicidally effective amounts, with a conditioning agent of the kind used and referred to in the art as a pest control adjuvant or modifier in order to provide formulations adapted for ready and efficient application to soil or weeds (i.e., unwanted plants) using conventional applicator equipment.

Thus the herbicidal compositions, or formulations, are prepared in the form of either powdered solids or liquids. The liquid compositions, whether solutions or dispersions of the active substituted urea in a liquid diluent, contain as a conditioning agent a surface-active dispersing agent in amounts sufficient to render the liquid composition readily dispersible in water for application as an aqueous spray. The powdered solid herbicidal compositions preferably also contain a surface-active dispersing agent in amount sufficient to impart water dispersibility to the powdered compositions, altho the surface-active dispersing agent can be omitted if it is desired to apply the compositions by dusting rather than spraying. However, even tho the surface-active dispersing agent be omitted in the latter event, the herbicidal composition will still contain, of course, a powdered solid carrier or diluent as a conditioning agent.

The surface-active dispersing agents employed in the herbicidal compositions of the invention are sometimes referred to in the art as wetting, dispersing, or penetrating agents. They are agents which cause the compositions, whether in liquid or powdered solid form, to be easily dispersed in water to give aqueous sprays. They can be of the anionic, cationic, or nonionic type and include, for example, sodium and potassium oleates, the amine salts of oleic acid such as morpholine and dimethylamine oleates, the sulfonated animal and vegetable oils such as sulfonated fish and castor oils, sulfonated petroleum oils, sulfonated acyclic hydrocarbons, sodium salt of lignin sulfonic acid (goulac), alkylnaphthalene sodium sulfonate, sodium salts of sulfonated condensation products of naphthalene and formaldehyde, sodium lauryl sulfate, disodium monolauryl phosphate, sorbitol laurate, pentaerythritol monostearate, glycerol monostearate, diglycol oleate, polyethylene oxides, ethylene oxide condensation products with stearyl alcohol and octylphenol, polyvinyl alcohols, salts, such as the acetate of polyamines from reductive amination of ethylene/carbon monoxide polymers, laurylamine hydrochloride, laurylpyridinium bromide, stearyltrimethylammonium bromide, cetyldimethylbenzyl ammonium chloride, lauryldimethylamine oxide, and the like. Generally, the surface-active agent will not comprise more than about 5 to 15% by weight of the composition, and in certain compositions the percentage will be 1% or less. Usually the minimum lower concentration will be 0.1%.

Powdered or dust compositions of the invention whether or not also modified with a surface-active dispersing agent to make them water dispersible are prepared by admixing one or more of the active substituted ureas with finely divided solids, preferably, talcs, natural clays, pyrophyllite, diatomaceous earth, and flours such as walnut shell, wheat, redwood, soya bean, and cottonseed flours. Other inert solid carriers which can be used to prepare the herbicidal formulations include magnesium and calcium carbonates, calcium phosphate, sulfur, lime, etc. either in powder or granular form. The percentage by weight of the essential active ingredients will vary according to the manner in which the composition is to be applied but, in general, will be 0.5 to 95% by weight of the herbicidal composition.

The active substituted ureas can be dissolved in organic solvents such as cyclohexanol, furfural, acetone, isobutanol, ethanol, isopropylacetate, and the like in the preparation of liquid compositions of the invention. Concentrated water-dispersible liquid compositions can be prepared by incorporating the ureas and surface-active dispersing agents in various organic liquids such as furfural, methanol, isopropanol, isobutanol, xylol, cresol, cyclohexanone, acetone, methyl ethyl ketone, kerosene, trichloroethylene, dimethylformamide, dimethylacetamide, alkylated naphthalenes, and the like. Such compositions are readily dispersible in water and provide excellent aqueous herbicidal sprays for field application. The proportion of surface-active dispersing agent to urea can be 0.1 to 100% by weight in the water-dispersible herbicidal compositions.

The herbicidal compositions of the invention can also have incorporated therein oils, fats or similar vehicles such as cottonseed oil, olive oil, lard, paraffin oil, hydrogenated vegetable oils, etc. Adhesives such as gelatin, blood albumin, resins, for example, rosin, alkyd resins and the like, can also be used in certain compositions to increase retention or tenacity of deposits following application.

The herbicidal compositions are applied either as a spray or a dust to the locus or area to be protected from undesirable plant growth, commonly called weeds, i. e., plants growing where they are not wanted. Such application can be made directly upon the locus or area and the weeds thereon during the period of weed infestation in order to destroy the weeds, or alternatively, the application can be made in advance of an anticipated weed infestation to prevent such infestation. Thus, the compositions can be applied as aqueous foliar sprays but can also be applied as sprays directly to the surface of the soil. Alternatively, the dry powdered compositions can be dusted directly on the plants or on the soil. For some purposes, as in the treatment of ponds and lake bottoms, it will be convenient to use a pellet form of the composition.

In another method of application for weed control, the ureas are incorporated with fertilizers to form either powdery or granular herbicidal compositions that can be used in the cultivation of agricultural crops.

The active ingredients are, of course, applied in amount sufficient to exert the desired herbicidal action. The amount of herbicidally active compounds present in the compositions as actually applied for destroying or preventing weeds will vary with the herbicidal activity of the active ingredients, the purpose for which the application is being made (i. e., whether for short term or long term control), the manner of application, the particular weeds for which control is sought, and like variables. Certain of the specific examples to follow will illustrate various kinds and amounts of application and the results obtained thereby. In general, the herbicidal compositions as applied in the form of a spray or a dust will contain from about 0.02% to 95% by weight of herbicidally active ingredient.

The solid and liquid compositions described and employed herein for application of the essential active herbicidal ingredient all have the common property of permitting application of the herbicidal compositions through suitable jets, nozzles, or spreaders adapted to the handling of granular materials onto the plants being treated and will, for convenience, be designated as "fluent carriers." The fluent carriers with which this invention is primarily concerned are non-solvent fluent carriers.

In order that the invention may be better understood, the following examples are given in addition to the examples already given above. The examples illustrate typical hebicidal compositions of the invention, methods for their preparation, herbicidal applications, and the results obtained. The numbers following the tabulated ingredients represent parts by weight of the ingredients in the respective compositions.

EXAMPLE 1

*Water-dispersible powders*

The following powdered compositions are adapted for dispersing in water for application as a spray for the destruction and prevention of weeds. The powdered compositions are made by intimately mixing the listed ingredients using conventional mixing or blending equipment and then grinding the mixture to give a powder having an average particle size less than about 50 microns.

A

| | |
|---|---|
| 3-(3-chloro-p-tolyl)-1-methylurea | 75 |
| Fuller's earth | 23.75 |
| Sodium lauryl sulfate, 50% (wetting agent) | 1 |
| Methyl cellulose, 15 cps. (dispersing agent) | .25 |
| | 100 |

B

| | |
|---|---|
| 3-(2,5-dichlorophenyl)-1,1-dimethylurea | 80 |
| Sodium disulfonate of dibutyl phenylphenol (wetting and dispersing agent) | 2 |
| Bentonite | 18 |
| | 100 |

EXAMPLE 2

Dust formulations

The following compositions are adapted for direct application as dusts for the destruction or prevention of weeds using conventional dusting equipment. The dusts are made by blending or mixing the ingredients and grinding the mix to give compositions having an average particle size less than about 50 microns.

A

| | |
|---|---|
| 3-(m-tolyl)-1,1-dimethylurea | 20 |
| Talc | 80 |
| | 100 |

B

| | |
|---|---|
| 3-(2,4-dichlorophenyl)-1,1-diethylurea | 5 |
| Cottonseed oil | 4 |
| Walnut shell flour | 91 |
| | 100 |

EXAMPLE 3

Oil-water dispersible powders

The following powdered compositions are adapted for use in the preparation of spray compositions using either an oil, water, or a combination of oil and water as the liquid diluent. The powders are made by mixing and grinding as in the case of the powders of Example 2.

A

| | |
|---|---|
| 3-phenyl-1,1-diethylurea | 70 |
| Alkylated aryl polyether alcohol (wetting and dispersing agent) | 4 |
| Fuller's earth | 26 |
| | 100 |

B

| | |
|---|---|
| 3-(3,5-dichloro-p-tolyl)-1-methylurea | 80 |
| Ethylene oxide stearate-laurate (emulsifying agent) | 4 |
| Pyrophyllite | 16 |
| | 100 |

EXAMPLE 4

Water-dispersible liquid compositions

The following compositions are in a liquid form and are adapted for addition to water to give aqueous dispersions for application as sprays. The urea herbicides are generally quite insoluble in most oils. Therefore, the liquid compositions ordinarily are not complete solutions but rather are dispersions of solid in an oil. The liquid or fluid compositions shown are prepared by thoroughly mixing and dispersing the active compounds and conditioning agent or agents in an organic liquid diluent.

A

| | |
|---|---|
| 3-(3,4-dichlorophenyl)-1-methylurea | 25 |
| Long chain fatty alcohol sulfate (emulsifying agent) | 2 |
| Goulac (dispersing agent) | 3 |
| Kerosene | 70 |
| | 100 |

B

| | |
|---|---|
| 3-phenyl-1,1-dimethylthiourea | 30 |
| Alkylated aryl polyether alcohol (wetting and emulsifying agent) | 3 |
| Methyl cellulose (dispersing agent) | 1 |
| Kerosene | 66 |
| | 100 |

EXAMPLE 5

Granular compositions

The following compositions are adapted for application by means of a fertilizer spreader apparatus or similar equipment. The compositions are readily prepared by mixing the ingredients with water to form a paste. The paste is then extruded, dried, and ground to give the desired granular size. Preferably, the granules will be in the order of one-thirty second to one-quarter inch diameter.

A

| | |
|---|---|
| 3-(3,4-dichlorophenyl)-1-ethylurea | 10 |
| Goulac (dispersing agent) | 3 |
| Hydrocarbon oil | 1 |
| Dextrin (binding agent) | 20 |
| Fuller's earth | 66 |
| | 100 |

B

| | |
|---|---|
| 3-(p-chlorophenyl)-1-methylurea | 7 |
| Goulac | 3 |
| Refined kerosene | 1 |
| Gelatin | 25 |
| Talc | 64 |
| | 100 |

EXAMPLE 6

3-(p-chlorophenyl)-1,1-dimethylthiourea and 3-(p-tolyl)-1,1-dimethylurea each formulated as in the foregoing example killed the quack grass in 12 weeks when sprayed on the quack grass to the run-off point from aqueous dispersion containing 3% by weight of the test compound.

Following is a tabulation of the results obtained with herbicidal compositions of the invention containing various of the active compounds. In each case, the formulation employed contained 80% by weight of the active compound, 18% by weight of powdered solid diluent, and 2% by weight of wetting and dispersing agents.

Formulations of each of the compounds were dispersed in water to give aqueous spray compositions containing various concentrations of each of the active ingredients. Each aqueous dispersion was sprayed on three-month old quack grass plants from root cuttings and on six-week old Johnson grass seedlings to the run-off point. The per cent concentration shown below for each plant species was the concentration of the herbicidally active compound in the aqueous dispersion sprayed on the plants which was sufficient to effect kill of the Johnson grass seedlings in five weeks and the kill of the quack grass in three months.

| Example | Compound | Johnson grass seedlings | Quack grass |
|---|---|---|---|
| | | Percent | Percent |
| 7 | 3-phenyl-1,1-dimethylurea | 3 | 3 |
| 8 | 3-(p-chlorophenyl)-1-methylurea | 3 | 3 |
| 9 | 3-(p-tolyl)-1,1-dimethylurea | 3 | 3 |
| 10 | 3-(p-sec. butylphenyl)-1,1-dimethylurea | 3 | 3 |
| 11 | 3-(p-allyloxyphenyl)-1,1-dimethylurea | 3 | 3 |
| 12 | 3-(3,4-dichlorophenyl)-1-methylurea | 1 | 3 |
| 13 | 3-(p-bromophenyl)-1,1-dimethylthiourea | 3 | 3 |

Those skilled in the art will appreciate that other herbicidal compositions of the invention can be prepared and applied in accordance with the foregoing examples. Thus, the foregoing detailed description has been given for clearness of understanding only and no unnecessary limitations are to be understood therefrom.

I claim:

1. A method for the destruction and prevention of weeds which comprises applying to a locus to be protected, in amount sufficient to exert a herbicidal action, a 1,3-substituted urea selected from the group consisting of compounds represented by the formulas:

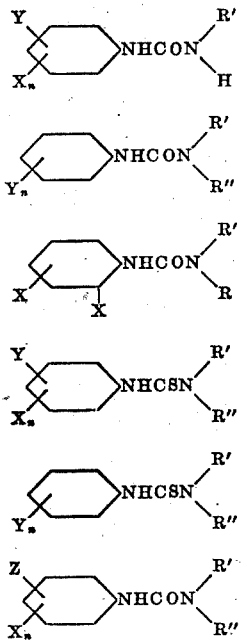

where R' is alkyl up to two carbon atoms; R'' is selected from the group consisting of hydrogen and alkyl up to two carbon atoms; X is halogen; Y is selected from the group consisting of hydrogen, R and OR, where R is a monovalent aliphatic hydrocarbon radical of up to four carbon atoms having at most one unsaturation and that ethylenic; Z is selected from the group consisting of alkenyl and alkenoxy radicals, the alkenyl radical in said alkenyl and alkenoxy substituents containing up to four carbon atoms; and $n$ is a positive integer up to two, the aromatic substituent having hydrogen on at least one of the nuclear carbons ortho to the nuclear carbon to which the urea nitrogen atom is linked.

2. A herbicidal composition comprising a conditioning agent and, in amount sufficient to exert herbicidal action, a 1,3-substituted urea selected from the group consisting of compounds represented by the formulas:

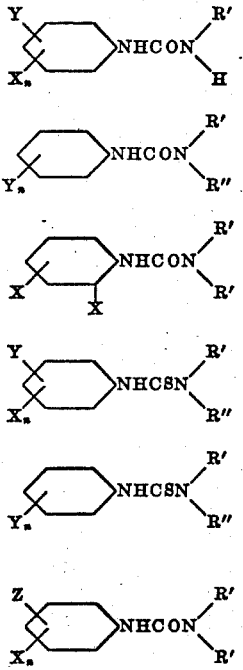

and where R' is alkyl up to two carbon atoms; R'' is selected from the group consisting of hydrogen and alkyl up to two carbon atoms; X is halogen; Y is selected from the group consisting of hydrogen, R and OR, where R is a monovalent aliphatic hydrocarbon radical of up to four carbon atoms having at most one unsaturation and that ethylenic; Z is selected from the group consisting of alkenyl and alkenoxy radicals, the alkenyl radical in said alkenyl and alkenoxy substituents containing up to four carbon atoms; and $n$ is a positive integer up to two, the aromatic substituent having hydrogen on at least one of the nuclear carbons ortho to the nuclear carbon to which the urea nitrogen atom is linked.

3. A herbicidal composition according to claim 2 containing a non-solvent fluent carrier as a conditioning agent.

4. A herbicidal composition according to claim 2 containing a surface-active dispersing agent as a conditioning agent.

5. A herbicidal composition comprising 3-(p-chlorophenyl)-1-methylurea in amount sufficient to exert herbicidal action and a surface-active dispersing agent in amount sufficient to impart water dispersibility to the composition.

6. A herbicidal composition comprising 3-(3,4-dichlorophenyl)-1-methylurea in amount sufficient to exert herbicidal action and a surface-active dispersing agent in amount sufficient to impart water dispersibility to the composition.

7. A herbicidal composition comprising 3-phenyl-1,1-dimethylurea in amount sufficient to exert herbicidal action and a surface-active dispersing agent in amount sufficient to impart water dispersibility to the composition.

8. A herbicidal composition comprising 3-(p-tolyl)-1,1-dimethylurea in amount sufficient to exert herbicidal action and a surface-active dispersing agent in amount sufficient to impart water dispersibility to the composition.

9. A herbicidal composition comprising 3-(m-tolyl)-1,1-dimethylurea in amount sufficient to exert herbicidal action and a surface-active dispersing agent in amount sufficient to impart water dispersibility to the composition.

CHARLES W. TODD.

References Cited in the file of this patent

UNITED STATES PATENTS

| Number | Name | Date |
|---|---|---|
| 2,341,863 | Hitchcock | Feb. 15, 1944 |
| 2,412,510 | Jones | Dec. 10, 1946 |
| 2,472,347 | Sexton | June 7, 1949 |

FOREIGN PATENTS

| Number | Country | Date |
|---|---|---|
| 574,995 | Great Britain | Jan. 30, 1946 |

OTHER REFERENCES

Thompson et al., "Botanical Gazette," vol. 107 (1946), pages 494 and 496.